(12) United States Patent
Komuro

(10) Patent No.: US 10,071,867 B2
(45) Date of Patent: Sep. 11, 2018

(54) HOLDING NOZZLE, HOLDING UNIT, AND TRANSPORTING APPARATUS

(71) Applicant: HIRATA CORPORATION, Shinagawa-ku, Tokyo (JP)

(72) Inventor: Shuichi Komuro, Tokyo (JP)

(73) Assignee: HIRATA CORPORATION, Shinagawa-Ku, Tokyo (JP)

( * ) Notice: Subject to any disclaimer, the term of this patent is extended or adjusted under 35 U.S.C. 154(b) by 112 days.

(21) Appl. No.: 15/061,287

(22) Filed: Mar. 4, 2016

(65) Prior Publication Data
US 2016/0257503 A1    Sep. 8, 2016

(30) Foreign Application Priority Data

Mar. 6, 2015   (JP) .................. 2015-045029

(51) Int. Cl.
  B25J 15/06    (2006.01)
  B65G 47/91    (2006.01)
  B25J 9/02     (2006.01)

(52) U.S. Cl.
  CPC ............ B65G 47/91 (2013.01); B25J 9/026 (2013.01); B25J 15/0616 (2013.01); B65G 47/912 (2013.01)

(58) Field of Classification Search
  CPC ............ H05K 13/0408; B25J 15/0616; B25J 15/0625; B25J 15/0633; B25J 15/0641; B65H 3/0883; B65H 5/14
  See application file for complete search history.

(56) References Cited

FOREIGN PATENT DOCUMENTS

| CN | 103112010 A | 5/2013 | |
|---|---|---|---|
| JP | H3-270890 A | 12/1991 | |
| JP | 05-067485 U | * 9/1993 | |
| JP | 3610168 B2 | 1/2015 | |
| SU | 1407802 A1 | 7/1988 | |
| WO | 90/14753 A1 | 11/1990 | |
| WO | WO-9014753 A1 | * 11/1990 | ............. H05K 13/04 |

OTHER PUBLICATIONS

Office Action (Notification of the First Office Action) dated Aug. 23, 2017, by the Chinese Patent Office in corresponding Chinese Patent Application No. 201610123831.7, and a partial English Translation of the Office Action. (17 pages).

* cited by examiner

*Primary Examiner* — Gerald McClain
(74) *Attorney, Agent, or Firm* — Buchanan Ingersoll & Rooney PC

(57) ABSTRACT

A holding nozzle sucking and holding a work by a negative pressure, comprising: a sucking member; a supporting member; and a biasing member, wherein the supporting member includes a first stop portion and a second stop portion for respectively defining a forward limit and a backward limit of the forward-and-backward movement of the sucking member.

9 Claims, 10 Drawing Sheets

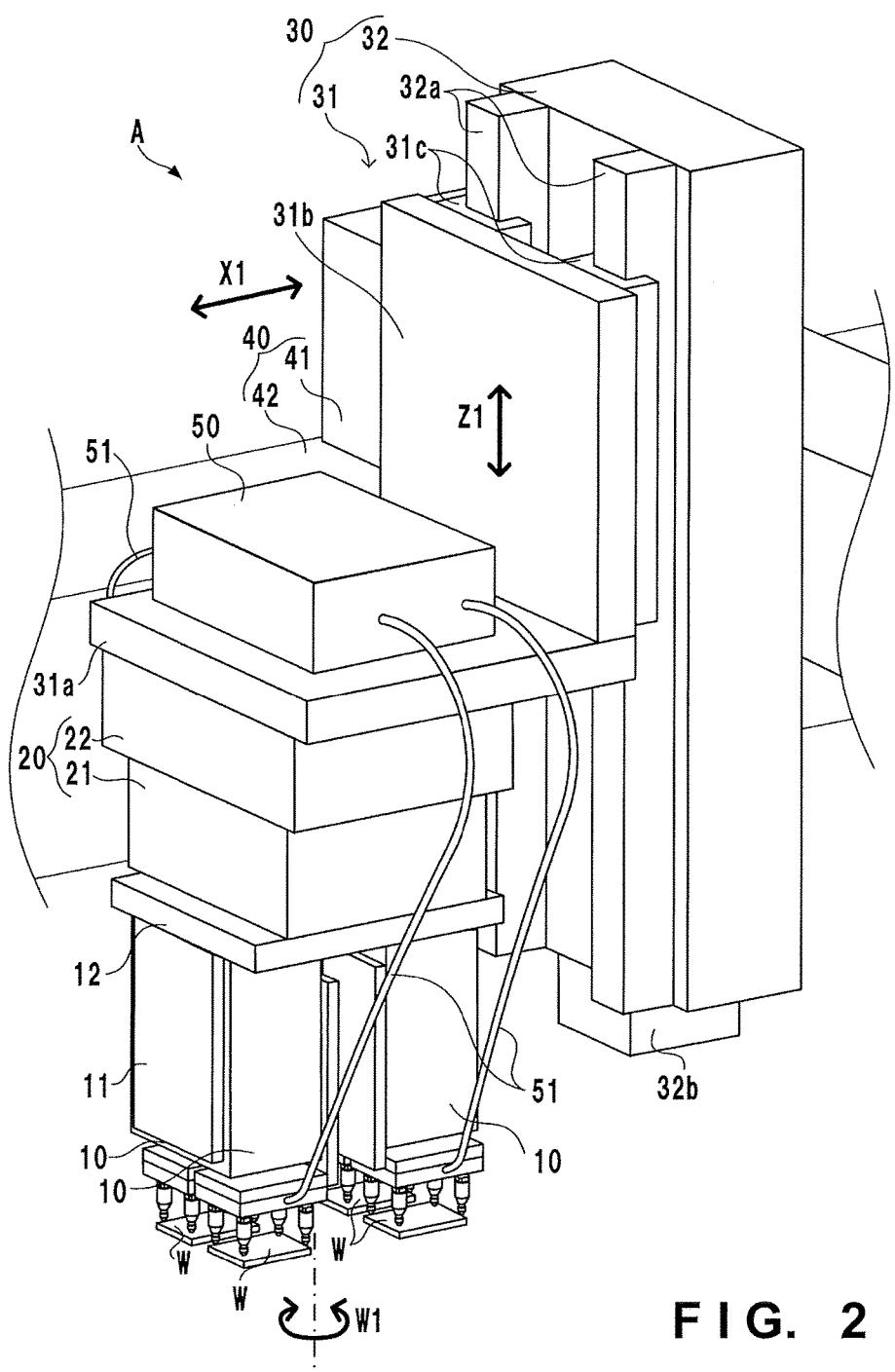
F I G. 2

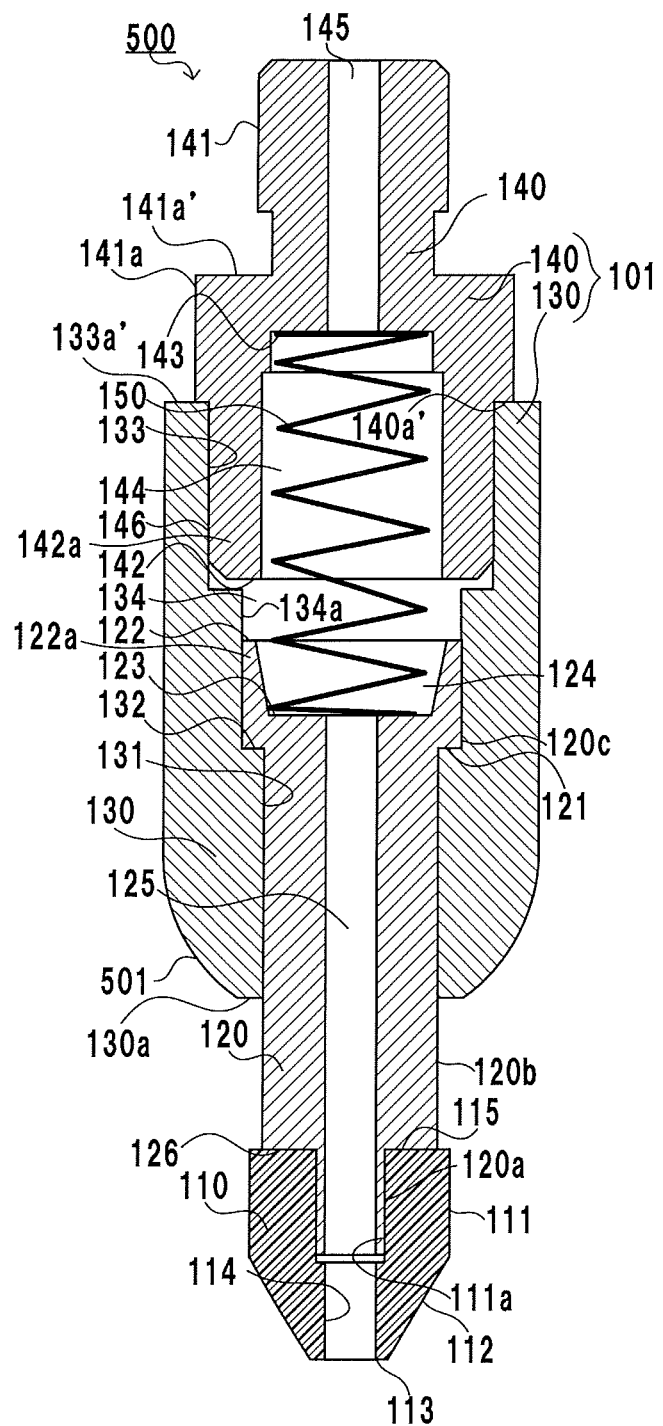
F I G. 10

HOLDING NOZZLE, HOLDING UNIT, AND TRANSPORTING APPARATUS

BACKGROUND OF THE INVENTION

Field of the Invention

The present invention relates to a holding nozzle.

Description of the Related Art

As a holding nozzle for holding a work when transporting it, there is a holding nozzle which sucks a work by using a negative pressure (a CD-ROM of Japanese Utility Model Application No. 4-16366 (Japanese Utility Model Laid-Open No. 5-67485)). Also, in order to capture an image of the posture of a work by a camera or the like when transporting the work, there is a holding nozzle which is fixed so as not to change the posture of the work (Japanese Patent No. 3610168).

When transporting a work, an impact which occurs when a holding nozzle contacts with the work is preferably as small as possible. In the technique described in Japanese Utility Model Laid-Open No. 5-67485, a negative pressure is generated in the holding nozzle by the repulsion of a spring in the holding nozzle, which is compressed as it is pressed against a work, and the work is sucked by this negative pressure. Accordingly, the technique described in Japanese Utility Model Laid-Open No. 5-67485 requires a force for compressing the spring when the holding nozzle contacts with a work, and the impact at that time is not small. Also, in the technique described in Japanese Patent No. 3610168, a hook for fixing the holding nozzle and an operating mechanism of the hook are exposed, so dust or the like generated from the hook or operating mechanism sometimes adheres to a work.

SUMMARY OF THE INVENTION

The present invention provides a technique which decreases the impact when a holding nozzle contacts with a work, and reduces the generation of dust to surroundings when fixing the holding nozzle.

According to an aspect of the present invention, there is provided a holding nozzle sucking and holding a work by a negative pressure, comprising: a sucking member including a sucking portion for sucking the work on one side of the sucking member; a supporting member connected to a negative pressure generating source, including an accommodating portion for accommodating the other side of the sucking member, and configured to support the sucking member so as to be able to move forward and backward; and a biasing member configured to bias the sucking member in a forward direction of the forward-and-backward movement, wherein the supporting member includes, in the accommodating portion, a first stop portion and a second stop portion for respectively defining a forward limit and a backward limit of the forward-and-backward movement of the sucking member.

Further features of the present invention will become apparent from the following description of exemplary embodiments (with reference to the attached drawings).

BRIEF DESCRIPTION OF THE DRAWINGS

FIG. 2 is an enlarged perspective view of a holding unit and transfer unit in the transporting apparatus;

FIG. 10 shows a holding nozzle according to the fifth embodiment.

DESCRIPTION OF THE EMBODIMENTS

Figure 1:
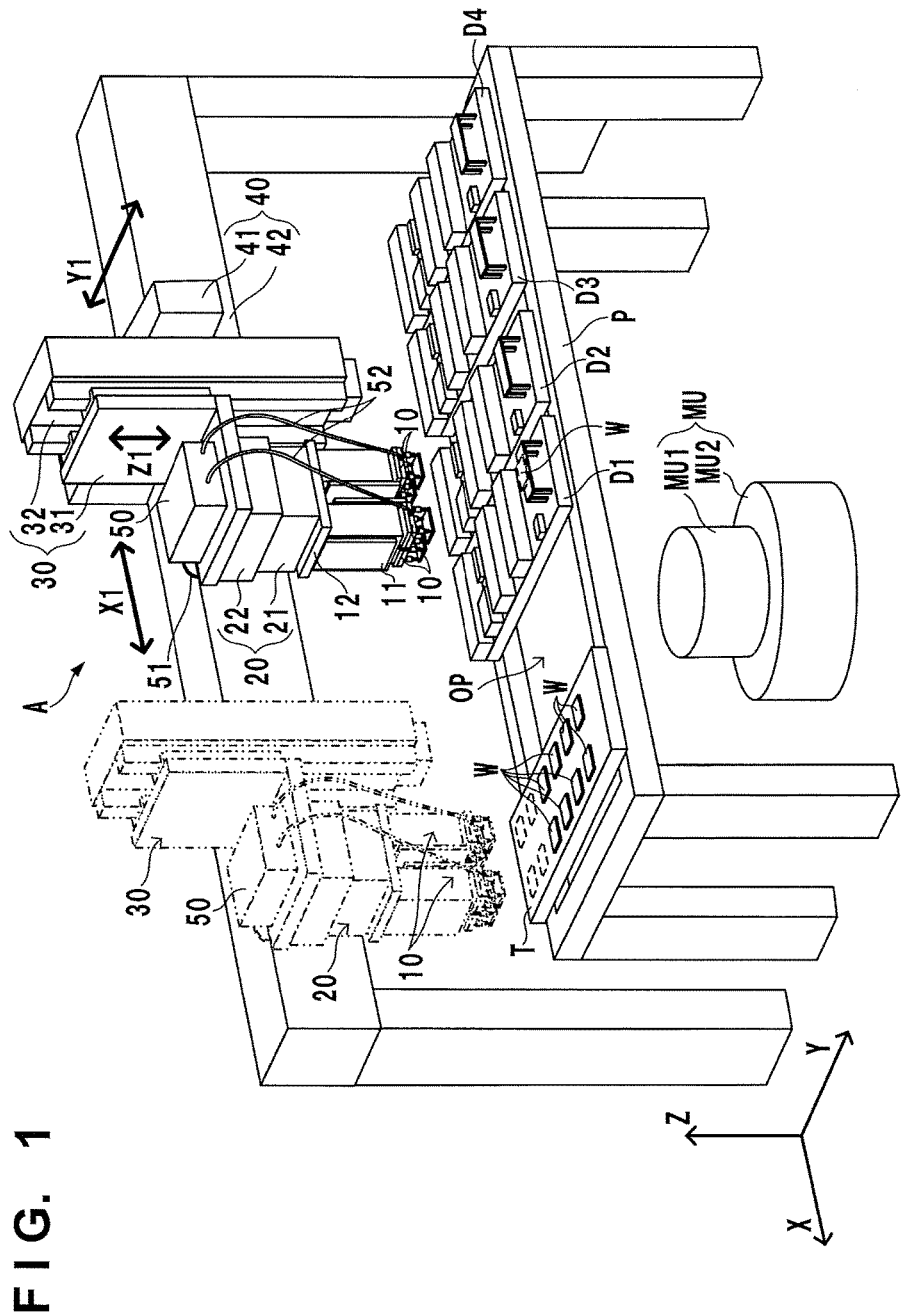
FIG. 1 is a view for explaining a system using a transporting apparatus according to the first embodiment of the present invention.

Exemplary embodiments of the present invention will be explained below with reference to the accompanying drawings. Note that in these drawings, the same reference numerals denote the same elements, and the vertical and horizontal directions on the drawing surfaces are used in the explanation of the text as the vertical and horizontal directions of apparatuses or members in the embodiments.

FIG. 1 is a view for explaining a system including a transporting apparatus A according to the first embodiment of the present invention. In FIG. 1, arrows X and Y indicate two directions which are horizontal directions and perpendicular to each other, and an arrow Z indicates a vertical direction. This system includes the transporting apparatus A, a processing table P, and a measurement unit MU. The transporting apparatus A is an apparatus which transports works W on a work holding tray T placed on the processing table P to devices D1, D2, D3, and D4 placed on the processing table P, and mounts the works W on the devices D1, D2, D3, and D4. The measurement unit MU includes an optical device MU1 such as a camera for measurement in the center, and an illuminating device MU2 arranged around the optical device MU1. However, this form is an example, and the measurement unit MU is not limited to this form.

The processing table P includes a mechanism (not shown) which positions, on the processing table P, the work holding tray T and devices D1, D2, D3, and D4 transferred from outside the processing table P. Also, the measurement unit MU arranged below the processing table P measures the horizontal-direction position of the work W held in the transporting apparatus A, and the posture of the work W in a plane direction parallel to the horizontal direction. Therefore, the processing table P on which the work holding tray T and devices D1, D2, D3, and D4 are placed has an opening OP through which the measurement unit MU arranged below the processing table P can measure the work W positioned above the processing table P from below.

<Transporting Apparatus A>

The transporting apparatus A includes four holding units 10 for holding the works W, a rotating mechanism 20 for rotating the holding units 10 around the vertical axis, an elevating mechanism 30 for moving the holding units 10 up and down in the vertical direction as the Z direction, and a moving mechanism 40 for moving the holding units 10 in the X and Y directions as the horizontal directions perpendicular to the vertical direction. A transfer unit includes the rotating mechanism 20, elevating mechanism 30, and moving mechanism 40. In addition, the transporting apparatus A includes a driving control unit 60 (see FIG. 5) for controlling driving of at least one of the rotating mechanism 20, the elevating mechanism 30, the moving mechanism 40, and a negative pressure generating source 50 (to be described later), based on the posture and holding position data of the work W measured by the measurement unit MU and position information of the transport destination to which the work W is to be transported.

FIG. 2 is an enlarged view for explaining details of the holding unit 10, rotating mechanism 20, and elevating mechanism 30. In this embodiment, the transporting apparatus A includes the four holding units 10 each of which holds one work W. Of the four holding units 10, two adjacent holding units 10 are regarded as a set, and each of two first supporting members 11 connects the two holding units 10. The two first supporting members 11 are connected to a second supporting member 12. Accordingly, the four holding units 10 are attached to the second supporting member 12.

The second supporting member 12 is connected to a rotor 21 of the rotating mechanism 20, and can be rotated by the rotating mechanism 20 around the vertical axis indicated by an arrow W1 shown in FIG. 2. Therefore, the four holding units 10 can move to draw an arc around the vertical axis by the rotating mechanism 20 as they are connected to the second supporting member 12. The rotor 21 of the rotating mechanism 20 is connected to a rotational driver 22 including a rotational driving source. An example of this rotational driving source is a driving source such as a motor. The rotational driver 22 is connected to the bottom surface of a horizontally extending bottom plate 31a of an elevator 31 of the elevating mechanism 30 formed into an L shape in a side view.

The elevator 31 is connected to a nut member (not shown) formed inside an elevational driver 32 including an elevational driving source. An example of this elevational driving source is a combination of a driving source such as a motor and a ball screw mechanism formed inside the elevational driver 32. The elevator 31 formed into an L shape in a side view includes the horizontally extending bottom plate 31a and a vertically extending side plate 31b. Two guide members 31c are arranged on a side surface (facing the elevational driver) of the side plate 31b of the elevator 31.

Also, two rail members 32a corresponding to the two guide members 31c are arranged parallel to each other in the vertical direction on that side surface of the elevational driver 32, which faces the elevator 31. In addition, a driving motor 32b for driving the ball screw unit is arranged at the lower end of the elevational driver 32. Accordingly, when the built-in nut moves along the ball screw by driving by the elevational driving source of the elevational driver 32, the elevator 31 moves upward and downward in the vertical direction indicated by an arrow Z1 shown in FIG. 2. Note that the elevational driving source is not limited to the abovementioned ball screw mechanism, and may also be, for example, a combination of a driving source such as a motor and a mechanism such as a rack-pinion mechanism.

The negative pressure generating source 50 for generating a negative pressure inside a holding nozzle 100 (to be described later) of the holding unit 10 is placed on the upper surface of the bottom plate 31a of the elevator 31. An example of the negative pressure generating source 50 is a vacuum pump. However, the negative pressure generating source 50 is not limited to this, and it is also possible to adopt any device as long as the device is a well-known negative pressure generator. Furthermore, an existing negative pressure installation of a factory may also be used as a negative pressure source of the holding nozzle 100 by connecting the installation by piping or the like. Four air tubes 51 extend from the negative pressure generating source 50 to the four holding units 10. One end of each air tube 51 is connected to the negative pressure generating source 50, and the other end thereof is connected to the holding unit 10.

Referring to FIG. 1 again, the elevating mechanism 30 for supporting the holding units 10, rotating mechanism 20, and negative pressure generating source 50 is connected to a first horizontal moving mechanism 41 included in the moving mechanism 40, and can move forward and backward along the first horizontal moving mechanism 41 in the direction of an arrow Y1 shown in FIG. 1 as one of the horizontal directions. To be movable between the work holding tray T and the plurality of devices D1, D2, D3, and D4 on the processing table P, the first horizontal moving mechanism 41 is connected to a second horizontal moving mechanism 42 included in the moving mechanism 40 and extending in the longitudinal direction of the processing table P, and can move forward and backward along the second horizontal moving mechanism 42 in the direction of an arrow X1 shown in FIG. 1 as the other one of the horizontal directions. Note that an example of the first horizontal moving mechanism 41 for moving the elevating mechanism 30 in the direction of the arrow Y1 shown in FIG. 1 and the second horizontal moving mechanism 42 for moving the first horizontal moving mechanism 41 in the direction of the arrow X1 shown in FIG. 1 is a combination of a driving source such as a motor and a mechanism such as a ball screw mechanism or rack-pinion mechanism.

<Holding Unit 10>

Figure 3:
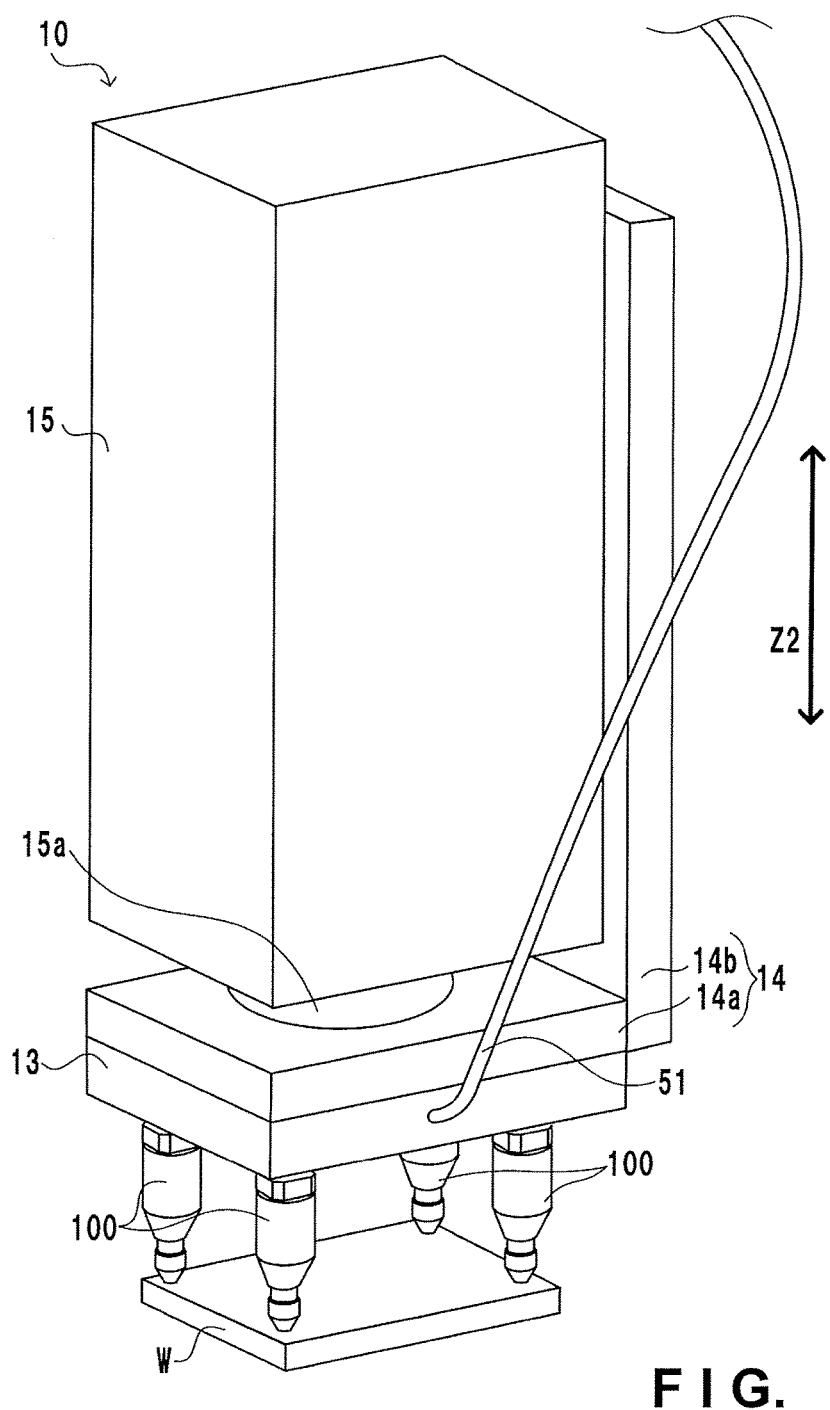
FIG. 3 is an enlarged perspective view of the holding unit.

FIG. 3 is an enlarged view of the holding unit 10. The holding unit 10 includes four holding nozzles 100, a nozzle supporting member 13 to which the holding nozzles 100 are attached, an elevator 14 connected to the nozzle supporting member 13, and a nozzle elevating unit 15 which moves the elevator 14 upward and downward. Note that a nozzle elevating mechanism includes the elevator 14 and nozzle elevating unit 15. In this embodiment, the four holding nozzles 100 are arranged at the four corners of a rectangle. When the work W is a rectangle, the four holding nozzles 100 hold the four corners of the rectangular work W, so the holding unit 10 can stably hold the work W.

The nozzle holding member 13 is connected to a horizontally extending bottom plate 14a of the elevator 14 having an L shape in a side view. Also, a vertically extending side plate 14b of the elevator 14 is connected to the nozzle elevating unit 15. In this state, a rod 15a extending from the lower surface of the nozzle elevating unit 15 is connected to the upper surface of the bottom plate 14a of the elevator 14. An example of the nozzle elevating mechanism including the elevator 14 and nozzle elevating unit 15 is a slide guide which is a combination of a driving source such as a motor and a ball screw mechanism or a mechanism such as an actuator using a fluid.

When the nozzle elevating unit 15 moves the rod 15*a* in a direction Z2 shown in FIG. 3 as the vertical direction, the bottom plate 14*a* and side plate 14*b* move following the rod 15*a*, so the elevator 14 can move in the vertical direction. Accordingly, the holding nozzles 100 connected to the elevator 14 and nozzle supporting member 13 can move in the vertical direction (the direction of the arrow Z2 in FIG. 3) by the nozzle elevating unit 15. Also, the air tube 51 connected to the negative pressure generating source 50 is connected to a side surface of the nozzle supporting member 13.

Figure 4:
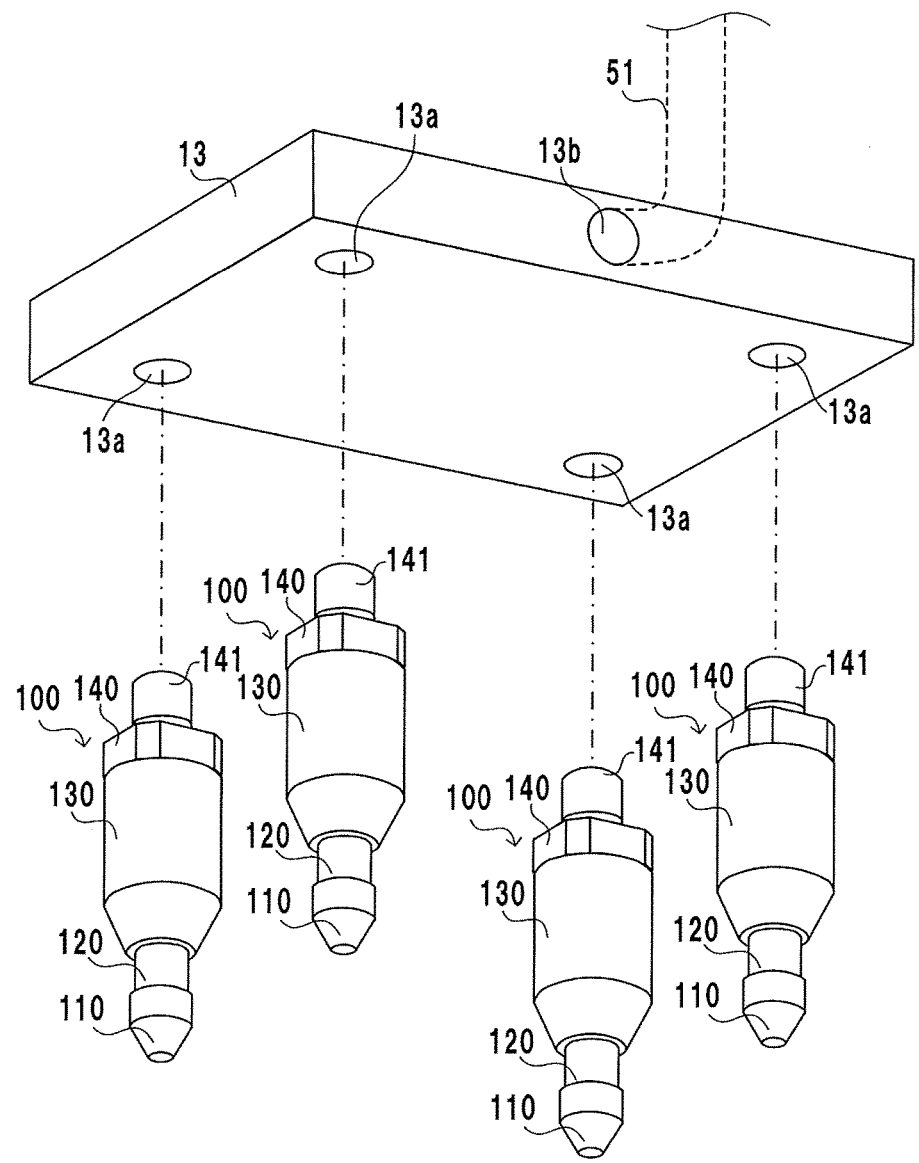
FIG. 4 is an exploded perspective view of holding nozzles and a nozzle supporting member.

FIG. 4 is an exploded perspective view of the four holding nozzles 100 and nozzle supporting member 13. The holding nozzle 100 includes a sucking portion 110 which contacts with and sucks the work W, a sucking member 120 having the sucking portion 110 on one side, a cylinder 130 accommodating the sucking member 120, and a head 140 connecting the cylinder 130 and nozzle supporting member 13. The head 140 includes a screw portion 141 projecting toward the nozzle supporting member 13 and having an outer circumferential surface on which a thread (male screw) is formed. The holding nozzle 100 is attached to a nozzle attaching portion 13*a* formed in the lower surface of the nozzle supporting member 13. A thread groove (female screw) is formed in the nozzle attaching portion 13*a*. The holding nozzle 100 is attached to the nozzle supporting member 13 by threadably engaging the screw portion 141 with the thread groove of the nozzle attaching portion 13*a*. Note that a method of attaching the holding nozzle 100 to the nozzle supporting member 13 is not limited to the above-mentioned method. For example, the holding nozzle 100 may also be attached by pressing the projecting portion of the head 140 into the nozzle attaching portion 13*a* without forming any thread groove.

A fluid connecting portion 13*b* to which the air tube 51 extending from the negative pressure generating source 50 is connected is formed in a side portion of the nozzle supporting member 13. The fluid connecting portion 13*b* is connected to a communication path (not shown) formed inside the nozzle supporting member 13. The communicating path (not shown) formed inside the nozzle supporting member 13 allows the four nozzle attaching portions 13*a* formed in the lower surface of the nozzle supporting member 13 to communicate with the fluid connecting portion 13*b*. In other words, an opening of the communication path, which faces the air tube 51, is the fluid connecting portion 13*b*, and openings of the communication path, which face the holding nozzles 100, are the nozzle attaching portions 13*a*. Note that the lengths of communication paths from the fluid connecting portion 13*b* to the nozzle attaching portions 13*a* are made equal to each other, in order to evenly supply a fluid from the fluid connecting portion 13*b* to the nozzle attaching portions 13*a*.

<Driving Control Unit 60>

Figure 5:
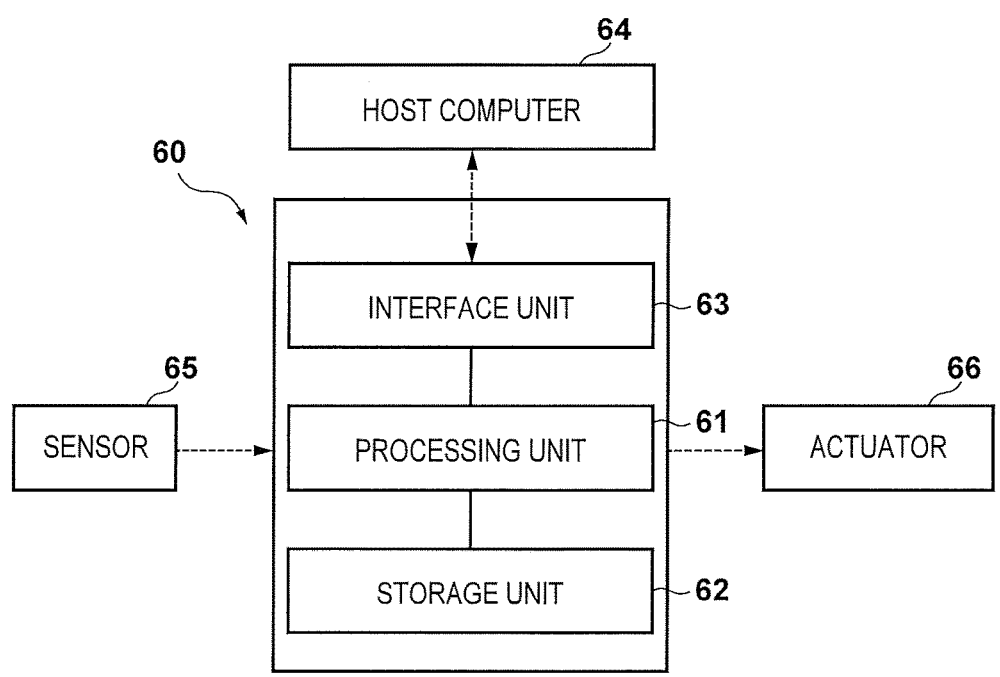
FIG. 5 is a block diagram of a driving control unit.

FIG. 5 is a block diagram of the driving control unit 60 for controlling the system of this embodiment. The driving control unit 60 includes a processing unit 61, storage unit 62, and interface unit 63 connected to each other by a bus (not shown). The processing unit 61 executes programs stored in the storage unit 62. The processing unit 61 is, for example, a CPU. The storage unit 62 is, for example, a RAM, ROM, or hard disk. The interface unit 63 is formed between the processing unit 61 and external devices (a host computer 64, sensor (input device) 65, and actuator (output device) 66). The interface unit 63 is, for example, a communication interface or I/O interface.

The sensor 65 includes sensors for sensing the positions of, for example, the elevator 14 to which the nozzle supporting member 13 is attached, the rotor 21, the elevator 31 of the elevating mechanism 30, the elevating mechanism 30 moved by the first horizontal moving mechanism 41, and the first horizontal moving mechanism 41 moved by the second horizontal moving mechanism 42, and an image sensor of the camera of the measurement unit MU. The actuator 66 includes the driving sources of the rotating mechanism 20, elevating mechanism 30, moving mechanism 40, and negative pressure generating source 50. The driving control unit 60 controls the transporting apparatus A in accordance with instructions from the host computer 64. A control example will be explained below.

<Operation of Transporting Apparatus A>

The operation of the transporting apparatus A will be explained with reference to FIG. 1. The processing table P is arranged along the second horizontal moving mechanism 42. The work holding tray T holding a plurality of unmounted works W is arranged in one end portion (the left end portion in FIG. 1) of the processing table P. The plurality of devices D1, D2, D3, and D4 (in this embodiment, four devices) are arranged toward the other end portion (the right end portion in FIG. 1) in a direction away from the work holding tray T.

When the transporting apparatus A transfers the works W from the work holding tray T to the devices D1, D2, D3, and D4, the driving control unit 60 first moves the holding units 10 (the holding units 10, rotating mechanism 20, elevating mechanism 30, and negative pressure generating source 50 indicated by the alternate long and two short dashed lines in FIG. 1) to a position above the work holding tray T by using the elevating mechanism 30 and moving mechanism 40. Then, the driving control unit 60 moves the holding unit 10 down toward some of the works W placed on the work holding tray T by using the elevating mechanism 30 and nozzle elevating mechanism, and causes the holding unit 10 to suck the work W as a target by the sucking operation of the holding nozzles 100 (to be described later). The holding unit 10 sucking the work W is moved up by the nozzle elevating mechanism and elevating mechanism 30.

Subsequently, the driving control unit 60 controls driving of the moving mechanism 40 to move the holding unit 10 holding the work W to a position above the measurement unit MU. After the work W arrives at the position above the measurement unit MU, the driving control unit 60 causes the measurement unit MU to capture an image of the work W from below. The driving control unit 60 acquires the posture of the work W in the horizontal rotational direction and the position information in the X-Y direction by the image sensor of the measurement unit MU. Note that an optical sensor capable of sensing, for example, visible light, infrared light, or ultraviolet light can be adopted as the measurement unit MU, and a CCD, CMOS sensor, or the like can be adopted as the image sensor.

The driving control unit 60 causes the rotating mechanism 20, elevating mechanism 30, and moving mechanism 40 to transport the holding unit 10 holding the work W measured by the measurement unit MU to the predetermined device D1 as a target. For example, when placing the work W in a predetermined portion of the device D1, the driving control unit 60 moves the holding unit 10 holding the work W to a position above the device D1 as indicated by the solid lines in FIG. 1. In this step, the driving control unit 60 controls driving of the rotating mechanism 20, elevating mechanism 30, and moving mechanism 40 based on the data of the work W measured by the measurement unit MU and the position information of the transport destination to which the work W is to be transported. Thus, the work W in a correct posture can accurately and reliably be positioned in the transfer destination.

Then, the driving control unit 60 causes the holding unit 10 to transfer the work W to the predetermined device D1. In this step, the driving control unit 60 causes the holding unit 10 to perform a procedure reverse to the procedure of sucking and holding the work W from the work holding tray T. After that, the driving control unit 60 similarly performs this process on the devices D2, D3, and D4 as well. When completing the process of transferring the four works W held by the four holding units 10 to the four devices D1, D2, D3, and D4 on the processing table P, the driving control unit 60 moves the holding units 10 to the position above the work holding tray T again.

Subsequently, the driving control unit 60 causes the holding units 10 to suck and hold new works W. In this step, the devices D1, D2, D3, and D4 on the processing table P on which the works W are already mounted are replaced with devices on which no works W are mounted, and these devices on which no works W are mounted wait until the holding units 10 sucking and holding the new works W arrive. Then, the driving control unit 60 moves the holding units 10 to the devices newly arranged on the processing table P, and causes the holding units 10 to mount the works W on the individual devices, in the same manner as above.

<Holding Nozzle 100>

Figures 6A, 6B:
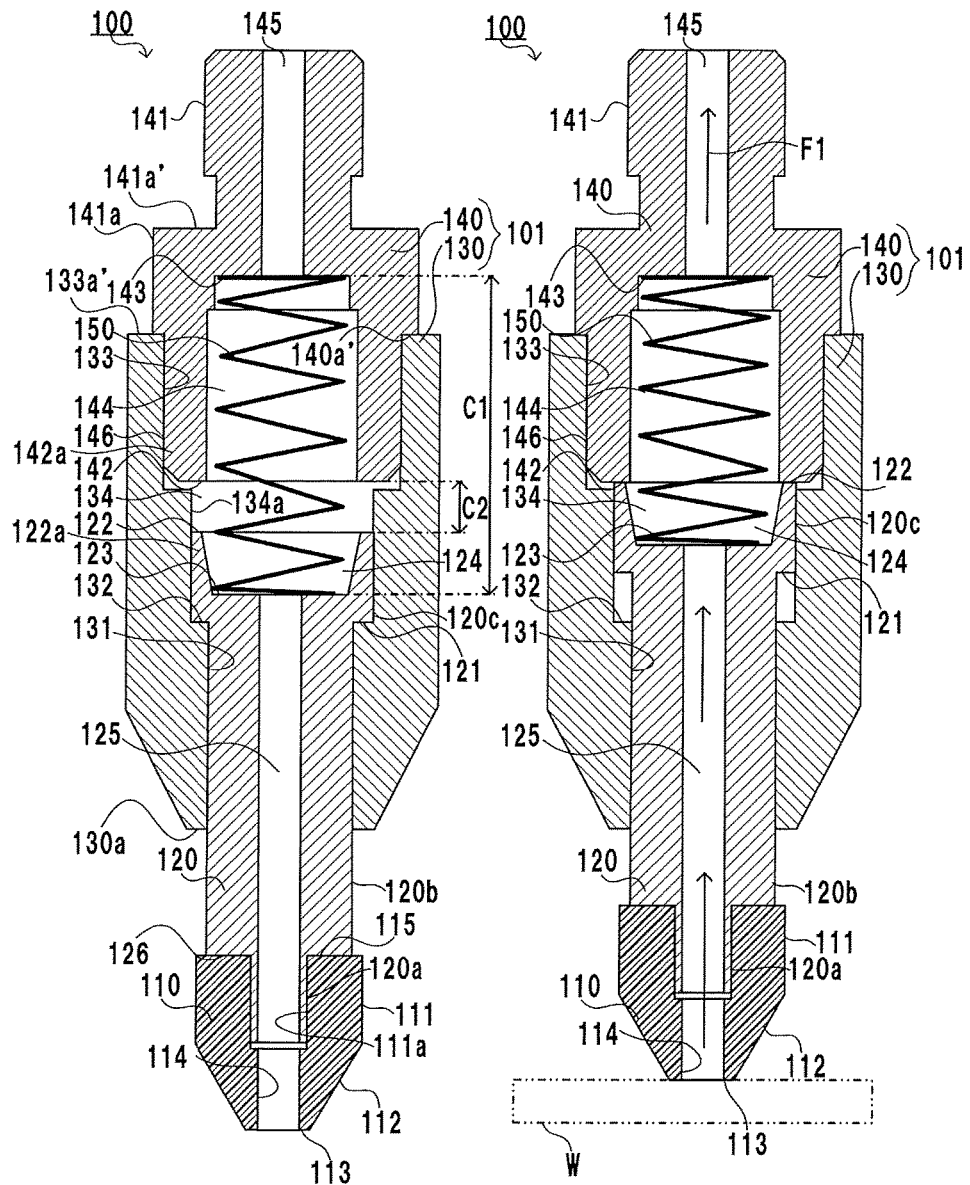
FIG. 6A is a sectional view showing a state in which no negative pressure is generated in the holding nozzle of the first embodiment.
FIG. 6B is a sectional view showing a state in which a negative pressure is generated in the holding nozzle of the first embodiment.
Figures 7A, 7B:
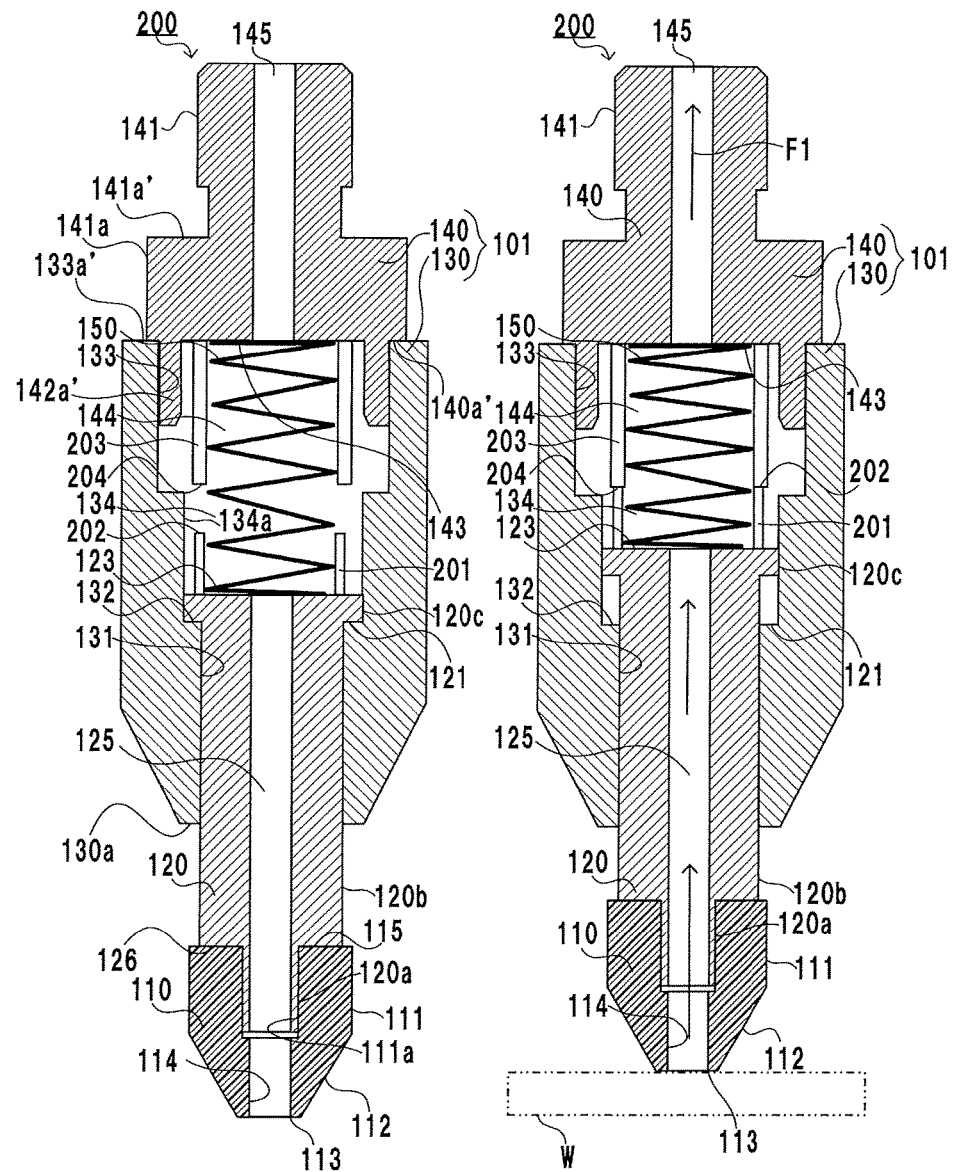
FIG. 7A is a sectional view showing a state in which no negative pressure is generated in a holding nozzle of the second embodiment.
FIG. 7B is a sectional view showing a state in which a negative pressure is generated in the holding nozzle of the second embodiment.
Figures 8A, 8B:
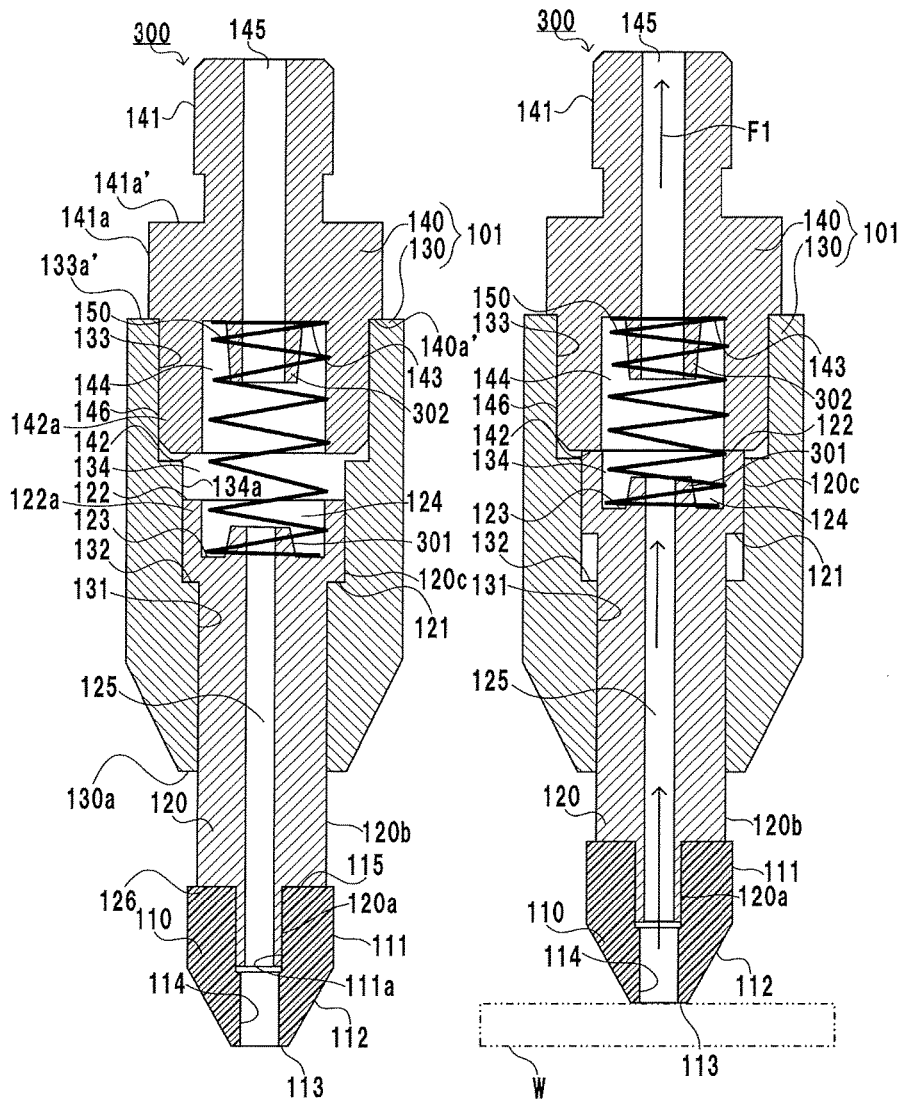
FIG. 8A is a sectional view showing a state in which no negative pressure is generated in a holding nozzle of the third embodiment.
FIG. 8B is a sectional view showing a state in which a negative pressure is generated in the holding nozzle of the third embodiment.
Figures 9A, 9B:
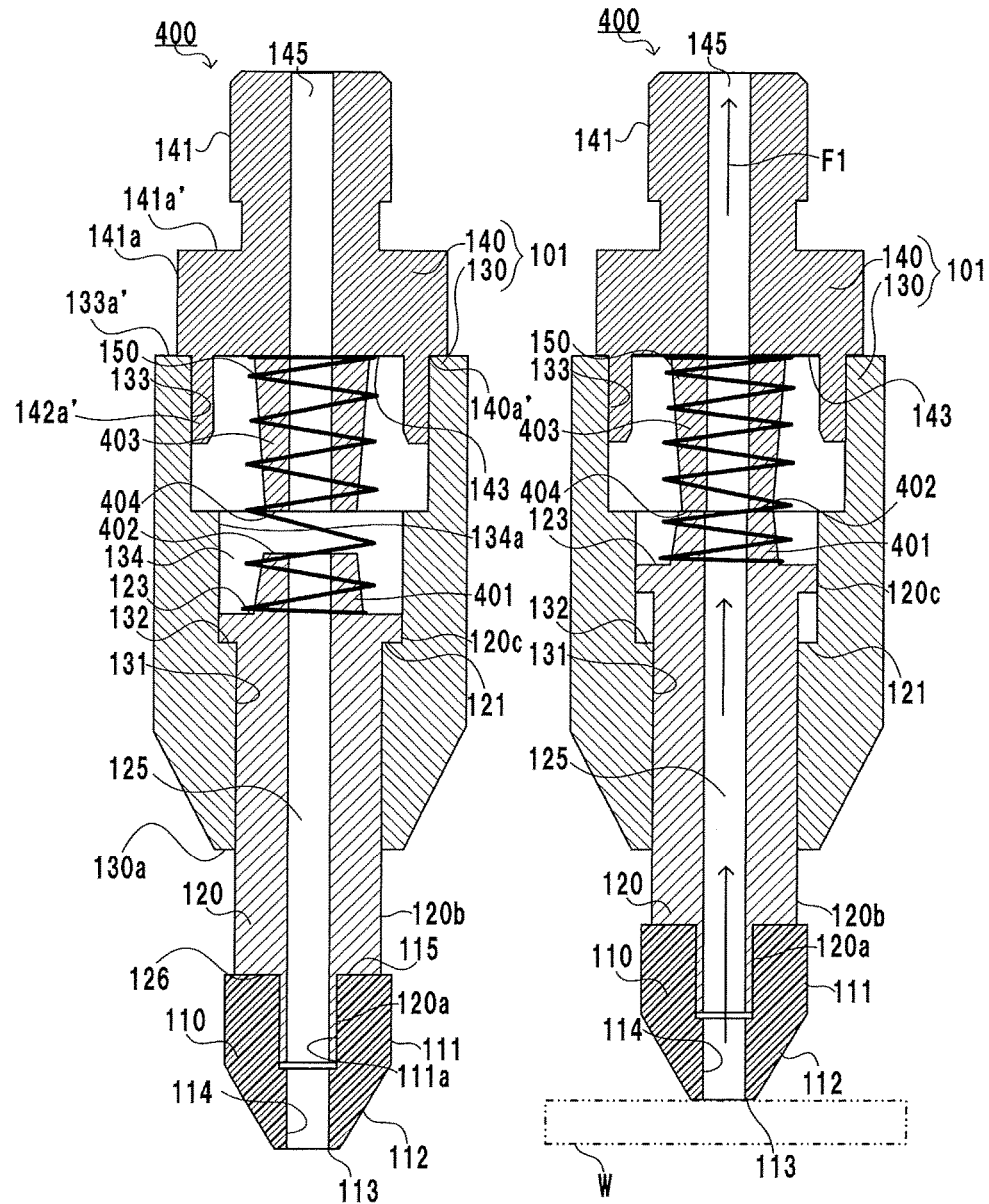
FIG. 9A is a sectional view showing a state in which no negative pressure is generated in a holding nozzle of the fourth embodiment.
FIG. 9B is a sectional view showing a state in which a negative pressure is generated in the holding nozzle of the fourth embodiment.

Next, details of the holding nozzle 100 will be explained with reference to FIGS. 6A and 6B. Also, details of holding nozzles according to other embodiments will be explained with reference to FIGS. 7A to 10. Note that in FIGS. 6A to 9B, each drawing A is a sectional view of the holding nozzle sucking no work, and each drawing B is a sectional view of the holding nozzle sucking a work. FIGS. 6A and 6B are sectional views of the holding nozzle 100 according to the first embodiment. FIGS. 7A and 7B are sectional views of a holding nozzle 200 according to the second embodiment. FIGS. 8A and 8B are sectional views of a holding nozzle 300 according to the third embodiment. FIGS. 9A and 9B are sectional views of a holding nozzle 400 according to the fourth embodiment. FIG. 10 is a sectional view of a holding nozzle 500 according to the fifth embodiment.

First Embodiment

The holding nozzle 100 shown in FIGS. 6A and 6B includes the sucking portion 110 for sucking the work W by a negative pressure, the sucking member 120, a supporting member 101, and a biasing member 150. The supporting member 101 includes the cylinder 130 accommodating the sucking member 120 such that the sucking member 120 can slide (can move forward and backward), and the head 140 formed in one end portion of the cylinder 130 and including a connection passage 145 connected to the negative pressure generating source 50 via the nozzle supporting member 13 and air tube 51.

<Sucking Portion 110>

The sucking portion (a nozzle distal end member) 110 includes a cylindrical portion 111 having an inner opening 111a connected to the sucking member 120, an inclined portion 112 extending from the cylindrical portion 111 to the distal end of the sucking portion 110 while decreasing the diameter, and a contact portion 113 which is formed at the distal end of the sucking portion 110 as an end portion of the inclined portion, and is a flat surface which comes in contact with the work W. The sucking portion 110 also includes a seat portion 115 as a flat surface in the end portion (the read end portion: the upper end in FIGS. 6A and 6B). Furthermore, a first fluid passage 114 extending in the longitudinal direction of the holding nozzle 100 is formed inside the sucking portion 110. The sucking portion 110 comes in direct contact with the work W, and hence is made of a material which does not harm the work W, for example, a resin such as rubber.

<Sucking Member 120>

The sucking portion 110 described above is formed in one end (the front end: the lower end in FIGS. 6A and 6B) of the sucking member 120. The other end (the rear end: the upper end in FIGS. 6A and 6B) of the sucking member 120 is accommodated in a sliding portion 131 and accommodating portion 134 formed inside the cylinder 130. The sucking member 120 is so supported as to be movable forward and backward with respect to the cylinder 130. A second fluid passage 125 is formed inside the sucking member 120. The second fluid passage 125 communicates with the first fluid passage 114 of the sucking portion 110 described above. Therefore, the accommodating portion 134 communicates with an external ambient around the distal end of the sucking portion 110.

The sucking member 120 is formed by a cylindrical member, and includes a small-diameter cylindrical portion 120a connected to the sucking portion 110, a first large-diameter cylindrical portion 120b having a diameter larger than that of the small-diameter cylindrical portion 120a and partially accommodated in the sliding portion 131 of the cylinder 130, and a second large-diameter cylindrical portion 120c having a diameter larger than that of the first large-diameter cylindrical portion 120b and including first and second contacting portions 121 and 122 (to be described later). The second large-diameter cylindrical portion 120c is accommodated in the accommodating portion 134. The small-diameter cylindrical portion 120a has an outer circumferential surface having a diameter smaller than that of the first cylindrical portion 120b, and is inserted into the inner opening 111a of the cylindrical portion 111. In this state, a step portion 126 between the small-diameter cylindrical portion 120a and first large-diameter cylindrical portion 120b is seated in the seat portion 115 of the sucking portion 110, thereby defining the relative positions of the sucking portion 110 and sucking member 120 in the axial direction. Examples of the form of this insertion are press-fit and fitting, and it is also possible to perform fixing by an adhesive.

(The outer circumferential surface of) the cylindrical portion 120b is slidably connected to the inner circumferential surface (the sliding portion 131) of the cylinder 130. A gap in which the sucking member 120 can slide is formed between the outer circumferential surface of the sucking member 120 and the inner circumferential surface of the cylinder 130. Note that when the holding nozzle 100 operates as will be described later, the flow rate of air flowing in and out through this gap is smaller than that of air sucked by the negative pressure generating source 50 and flowing through the first and second fluid passages 114 and 125, or smaller than that of air when suction holding is canceled (blow), so the influence of this gap on sucking holding or cancellation is small. Note that the direction in which the sucking member 120 moves forward and backward is parallel to the vertical axis.

The second large-diameter cylindrical portion 120c has an outer circumferential surface having a diameter larger than that of the first large-diameter cylindrical portion 120b, and includes the first contacting portion 121 in a step portion which is a portion connected to the first large-diameter cylindrical portion 120b, and the second contacting portion 122 in an end portion opposite to the first contacting portion 121 in the axial direction. The first and second contacting portions 121 and 122 respectively contact with first and second stop portions 132 and 142 (to be described later). Also, a first accommodating portion (one end portion of an accommodating portion) 124 as a closed-end depression for accommodating the biasing member 150 (to be described later) is formed inside the second large-diameter cylindrical portion 120c. In addition, the second large-diameter cylindrical portion 120c includes a circumferential wall portion 122a extending from the end portion of the first large-diameter cylindrical portion 120b of the sucking member 120 to the head 140, and including the second contacting portion 122 which forms the circumferential wall of the first accommodating portion 124. An end face 123 as the circular bottom portion of the first accommodating portion 124 and the circumferential wall portion 122a form a space in which one end portion of the biasing member 150 is accommodated. The diameter of the end portion 123 as the circular bottom portion of the first accommodating portion 124 is made equal to that of the biasing member 150. Accordingly, the bottom portion of the first accommodating portion 124 can stably hold the biasing member 150.

The second fluid passage 125 opens to the bottom portion of the first accommodating portion 124, and allows the accommodating portion 134 to communicate with the first fluid passage 114 of the sucking portion 110. Therefore, the second fluid passage 125 is formed inside the sucking member 120 to extend from one end portion to the other. In other words, the second fluid passage 125 is formed from the small-diameter cylindrical portion 120a to extend through the first large-diameter cylindrical portion 120b and a portion of the second large-diameter cylindrical portion 120c.

<Cylinder 130>

The cylinder 130 forming the supporting member 101 includes a through hole portion which increases the inner diameter step by step, and also includes, in the order named from the front end (the lower end in FIGS. 6A and 6B), the sliding portion 131 forming a first space which accommodates the sucking member 120, an inner circumferential wall 134a forming a second space having a diameter larger than that of the sliding portion 131, and a portion 133 to be connected which forms a third space having a diameter larger than that of the inner circumferential wall 134a. The accommodating portion 134 is formed by a region surrounded by the inner circumferential wall 134a of the cylinder 130 and (the inner circumferential wall of) the head 140. The biasing member 150 accommodated in the accommodating portion 134 biases the sucking member 120 in the forward direction of the forward and backward movement. The inner spaces formed by the sliding portion 131, inner circumferential wall 134a, and portion 133 to be connected communicate with each other, thereby forming a passage extending through the cylinder 130. Also, the first stop portion 132 is formed in a step as the connecting portion of the sliding portion 131 and inner circumferential wall 134a. Examples of the first stop portion 132 are a form in which it is continuously formed into an annular shape along the circumferential direction of the inner circumferential wall 134a, and a form in which it is discontinuously arranged along the circumferential direction of the inner circumferential wall 134a. Note that the form in which the first stop portion 132 is discontinuously arranged along the circumferential direction includes a form in which a portion of the first stop portion 132 in the circumferential direction is depressed toward the front end (the lower end in FIGS. 6A and 6B) in the axial direction, so the upper end face of the first stop portion 132 is discontinuously arranged along the circumferential direction.

The cylinder 130 includes a tapered portion which gradually decreases the diameter, in a portion of the outer circumferential surface, for example, in a portion from a middle portion of the sliding portion 131 to the end portion (the lower end in FIGS. 6A and 6B) of the cylinder 130. A connecting portion 146 of the head 140 (to be described later) is connected to the portion 133 to be connected of the cylinder 130. Also, a defining portion 133a' for defining the attachment position of the head 140 is so formed as to continue from the portion 133 to be connected of the cylinder 130.

<Head 140>

The head 140 forming the supporting member 101 has one end portion (the rear end portion: the upper end portion in FIGS. 6A and 6B) in the axial direction, which is connected to the nozzle supporting member 13, and the other end portion (the front end portion: the lower end portion in FIGS. 6A and 6B) in the axial direction, which is connected to the cylinder 130. The screw portion 141 to be connected to the nozzle attaching portion 13a of the nozzle supporting member 13 is formed in one end portion of the head 140 in the axial direction. In this embodiment as described previously, the head 140 is attached to the nozzle supporting member 13 by threadably engaging the thread groove of the screw portion 141 with the nozzle attaching portion 13a of the nozzle supporting member 13. An extended surface 141a' radially extending from the axis of the head 140 is formed in the other end portion of the screw portion 141. In addition, an outer circumferential portion 141a extending from the extended end portion to the other end portion and having a diameter larger than that of the screw portion 141 is formed. An contacting portion 140a' for contacting with the defining portion 133a' of the cylinder 130 is formed on the outer circumferential portion 141a, and the connecting portion 146 (to be described later) having a diameter smaller than that of the outer circumferential portion 141a is formed from the contacting portion 140a'.

In the other end portion (the lower end portion in FIGS. 6A and 6B) of the head 140 in the axial direction, a second accommodating portion (the other portion of the accommodating portion) 144 as a closed-top depression for accommodating the biasing member 150 is formed. That is, the head 140 extends from the inner edge portion opposing the end portion on the other side of the sucking member 120 toward the sucking member 120, and includes the connecting portion 146 and second stop portion 142, a circumferential wall portion 142a forming the circumferential wall of the second accommodating portion 144 is formed, and an inner end face 143 as a circular lid of the second accommodating portion 144 and the circumferential wall portion 142a form a space for accommodating the other end portion of the biasing member 150. Also, the diameter of the inner end face 143 as the circular lid of the second accommodating portion 144 is made equal to that of the biasing member 150, so the lid of the second accommodating portion 144 can stably hold the biasing member 150.

Furthermore, the connecting portion 146 to be connected to the portion 133 to be connected as a portion on one side of the cylinder 130 is formed on the outer circumference of the head 140 and in the end portion of the head 140, which faces the sucking member 120. In this embodiment, the cylinder 130 and head 140 are integrated by pressing the connecting portion 146 into the portion 133 to be connected. When the cylinder 130 and head 140 are connected and integrated, the contacting portion 140a' and defining portion 133a' contact with each other, thereby defining their positions in the axial direction, and defining a distance C2 at which the sucking member 120 moves in the accommodating portion 134 of the cylinder 130 and the space of the accommodating portion 134 in the axial direction. In addition, a sealed state (close contact state) in the connecting portion is formed because the contacting portion 140a' and defining portion 133a' contact with each other. Note that the cylinder 130 and head 140 may also be connected by forming thread grooves in the connecting portion 146 and portion 133 to be connected, and threadably engaging them. The second stop portion 142 is formed on the end face of the connecting portion 146, which faces the sucking member 120. The second stop portion 142 opposes the second contacting portion 122 of the sucking member 120 so that the second contacting portion 122 can contact.

Note that the head 140 includes the connection passage 145 which opens to the second accommodating portion 144. When the head 140 of the holding nozzle 100 is attached to the nozzle supporting member 13, the connection passage 145 communicates with the communication path of the nozzle supporting member 13. As described above, the supporting member 101 including the cylinder 130 and head 140 includes the first and second stop portions 132 and 142 which define the advance limit and retreat limit of the forward and backward movement of the sucking member 120. The cylinder 130 includes the first stop portion 132 inside it, and the head 140 includes the second stop portion 142 in the front end portion positioned inside the cylinder 130.

<Biasing Member 150>

The biasing member 150 is a coil spring having one end portion accommodated in the first accommodating portion 124 of the sucking member 120, and the other end portion accommodated in the second accommodating portion 144 of the head 140. In this state, the biasing member 150 has one end face which contacts with the end face 123 of the end portion on the other side of the sucking member 120, and the other end face which contacts with the inner end face 143 of the inner end portion of the head 140. Although the biasing member 150 is a coil spring in this embodiment, the biasing member 150 is not limited to this. For example, the biasing member 150 may also be formed by a sponge-like resin material which contains a porous portion and can restore after being compressed.

<Sucking Operation>

An operation when the holding nozzle 100 sucks and holds the work W will be explained with reference to FIGS. 6A and 6B. FIG. 6A shows a state in which no work W is sucked and no negative pressure is generated in the holding nozzle 100. When no work W is sucked, the first stop portion 132 and first contacting portion 121 of the holding nozzle 100 contact with each other, but the second stop portion 142 and second contacting portion 122 do not contact with each other. In this state, a length (total length) C1 of the biasing member 150 is the distance between the end face 123 as the bottom portion of the first accommodating portion 124 and the inner end face 143 as the lid of the second accommodating portion 144. Also, the distance C2 at which the sucking member 120 moves with respect to the cylinder 130 when sucking is performed is the distance between the second contacting portion 122 and second stop portion 142 when no sucking is performed. The holding nozzle 100 is designed such that the ratio of the moving distance C2 to the total length C1 is very low, for example, ⅕ to ⅒.

FIG. 6B shows a state in which the work W is sucked and a negative pressure is generated in the holding nozzle 100. To change the state shown in FIG. 6A in which no work W is sucked to the state shown in FIG. 6B in which the work W is sucked, the abovementioned driving control unit 60 moves the holding unit 10 close to the work W, and causes the contact portion 113 of the holding nozzle 100 and sucking portion 110 to contact with the surface of the work W.

Then, the driving control unit 60 drives the negative pressure generating source 50, and exhausts air inside the holding nozzle 100 to the outside of the holding nozzle 100 through the connection passage 145 of the head 140, as indicated by an arrow F1 in the fluid passage shown in FIG. 6B. In this state, the sucking portion 110 of the work W contacts with the contact portion 113, and one opening of the first fluid passage 114 is closed with the work W, so the accommodating portion 134 containing the biasing member 150 is set at a negative pressure. As a consequence, the internal negative pressure of the holding nozzle 100 moves the sucking member 120 toward the head 140 against the biasing force of the biasing member 150.

This movement of the sucking member 120 toward the head 140 stops when the second contacting portion 122 contacts with the second stop portion 142. When the contact portion 113 contacts with the work W, therefore, the position of the contact portion 113 in the axial direction is defined in the sucking portion 110. This increases the accuracy of the holding position of the sucking portion 110 when the sucking portion 110 sucks and holds the work W. As a mechanism for fixing the sucking member 120 in the axial direction, the second contacting portion 122 and second stop portion 142 are formed in the accommodating space 134 of the supporting member 101. Accordingly, this mechanism can be accommodated inside the holding nozzle 100, so dust generated when the holding nozzle 100 operates exerts no influence on the surroundings, particularly, the work W. Note that as described previously, the gap of the sliding portion between the first large-diameter cylindrical portion 120b and sucking member 120 is set to be small so as not to have any influence on the negative pressure in the holding nozzle 100.

When a negative pressure is set inside the holding nozzle 100, therefore, the sucking member 120 moves, so the first stop portion 132 and first contacting portion 121 move away from each other, and the second stop portion 142 and second contacting portion 122 contact with each other, thereby setting the holding nozzle 100 in the sucking state shown in FIG. 6B. Also, since the first and second contacting portions 121 and 122 and first and second stop portions 132 and 142 are arranged inside the holding nozzle 100, dust generated when the holding nozzle 100 operates exerts no influence on the surroundings, particularly, the work W.

As described above, after the sucking member 120 moves, the second contacting portion 122 contacts with the second stop portion 142, thereby defining the axial-direction position of the sucking member 120. When the work W is sucked, therefore, the position (depth) of image sensing of the work W by the measurement unit MU, for example, a camera is always accurately maintained constant. Also, when the negative pressure generating source 50 is stopped and air flows into the holding nozzle 100, the negative pressure of the internal space of the holding nozzle 100 decreases, and the sucking member 120 moves down by the biasing force of the biasing member 150. Accordingly, the first stop portion 132 and first contacting portion 121 of the holding nozzle 100 contact with each other, and the axial-direction position of the sucking member 120 when no sucking is performed can be defined, in this case as well.

Furthermore, the holding nozzle 100 accommodates the biasing member 150 over the total length C1, and the distance C2 at which the sucking member 120 moves when sucking the work W is made much shorter than the total length C1. When sucking the work W, therefore, the ratio at which the biasing member 150 is compressed with respect to the total length C1 decreases, so a uniform biasing force can be applied regardless of a manufacturing error of the biasing member 150. That is, a biasing force difference between expansion and contraction of the biasing member 150 is set within a predetermined range. This makes it possible to decrease the impact generated between the contact portion 113 of the holding nozzle 100 and the work W (the stress to be applied to the work W) when the holding nozzle 100 picks up the work W and places it.

Second Embodiment

FIGS. 7A and 7B show the holding nozzle 200 according to the second embodiment. The differences of this embodiment from the holding nozzle 100 according to the first embodiment are a first accommodating portion 124 and second contacting portion 122 of a sucking member 120 and a second accommodating portion 144, connecting portion 146, and second stop portion 142 of a head 140. Note that the same reference numerals as used in the first embodiment denote other members adopting the same elements in FIGS. 7A and 7B.

The holding nozzle 200 of this embodiment adopts three first rods 201 including second contacting portions 202 and arranged at equal intervals of 120° in the circumferential direction, instead of a portion (the circumferential wall portion 122a) of the second large-diameter cylindrical portion 120c forming the first accommodating portion 124 of the first embodiment. The three first rods 201 stand on an end face 123 of a sucking member 120 and are radially arranged around the axis of the sucking member 120, and (a portion of: an end portion of) a biasing member 150 is accommodated in a space surrounded by the three first rods 201. The diameter of a circle formed by the three first rods 201 is made almost equal to that of the end portion of the biasing member 150. Also, the end portion of each first rod 201, which faces the head 140, is the second contacting portion 202.

Furthermore, the holding nozzle 200 of this embodiment includes a circumferential wall portion 142a' formed to extend toward the sucking member 120 and having a small circumferential-wall height, instead of the circumferential wall portion 142a of the connecting portion 146 forming the second accommodating portion 144 of the first embodiment. In addition, the holding nozzle 200 adopts three second rods 203 including second stop portions 204 and arranged at equal intervals of 120° in the circumferential direction, instead of the second stop portion 142. The three second rods 203 stand on the head 140 and are radially arranged, and the biasing member 150 is accommodated in a space surrounded by the three first rods 203. The diameter of a circle formed by the three second rods 203 is made almost equal to that of the end portion of the biasing member 150. Also, the end portion of each second rod 203, which faces the sucking member 120, is the second stop portion 204.

The sucking operation of the holding nozzle 200 is the same as that of the holding nozzle 100 according to the first embodiment. As shown in FIG. 7B, in a state in which sucking and holding of the work W are complete, the second contacting portions 202 of the first rods 201 contact with the second stop portions 204 of the second rods 203, thereby defining the holding position of the sucking member 120.

This embodiment can reduce the mass of parts arranged inside the holding nozzle 200, and hence can reduce the weight of the holding nozzle 200. Also, since the first and second accommodating portions 124 and 144 need not be formed in the sucking member 120 and head 140, the number of steps of processing these parts can be reduced. Note that the first rods 201 are threadably engaged with thread grooves formed in the end face 123 on which they are formed, and the second rods 203 are threadably engaged with thread grooves formed in an inner end face 143 on which they are formed. Alternatively, it is also possible to form holes in the end face 123 and inner end face 143, and press one end portion of each of the first rods 201 and second rods 203 into the hole.

Third Embodiment

FIGS. 8A and 8B show the holding nozzle 300 according to the third embodiment. This embodiment differs from the holding nozzle 100 according to the first embodiment in that extended portions of fluid passages are additionally formed in a first accommodating portion 124 of a sucking member 120 and in a second accommodating portion 144 of a head 140. Note that the same reference numerals as used in the first embodiment denote other members adopting the same elements in FIGS. 8A and 8B.

In the holding nozzle 300 of this embodiment, a first extended portion 301 which extends a second fluid passage 125 in the axial direction is formed on an end face 123 of the first accommodating portion 124. The first extended portion 301 is formed to have a length by which the first extended portion 301 exists inside the sucking member 120 in the axial direction more than a second contacting portion 122 formed on an end face of a second large-diameter cylindrical portion 120c, which faces the head 140. That is, the first extended portion 301 does not project outside the sucking member 120 beyond the second contacting portion 122. Also, a biasing member 150 is arranged in the first accommodating portion 124 and on the outer circumferential surface of the first extended portion 301. Thus, the biasing member 150 can be held more stably in the first accommodating portion 124.

Furthermore, in the holding nozzle 300 of this embodiment, a second extended portion 302 which extends a connection passage 145 in the axial direction is formed on an end face 143 of the second accommodating portion 144. The second extended portion 302 is formed to have a length by which the second extended portion 302 exists inside the head 140 in the axial direction more than a second stop portion 142 formed on an end face of a connecting portion 146 of the head 140, which faces the sucking member 120. That is, the second extended portion 302 does not project outside the head 140 beyond the second stop portion 142. Also, the biasing member 150 is arranged in the second accommodating portion 144 and on the outer circumferential surface of the second extended portion 302. Thus, the biasing member 150 can be held more stably in the second accommodating portion 144.

The sucking operation of the holding nozzle 300 is the same as that of the holding nozzle 100 according to the first embodiment. As shown in FIG. 8B, in a state in which sucking and holding of the work W are complete, the second contacting portion contacts with the second stop portion 142, thereby defining the holding position of the sucking member 120.

In this embodiment, the volume of the inner space of the holding nozzle 300 (the accommodating portion 134) can be reduced by forming the passages in the first and second accommodating portions 124 and 144 for accommodating the biasing member 150. This makes it possible to reduce the amount of air to be exhausted from the holding nozzle during the sucking operation, and rapidly perform the sucking operation.

Fourth Embodiment

FIGS. 9A and 9B show the holding nozzle 400 according to the fourth embodiment. The differences of this embodiment from the holding nozzle 100 according to the first embodiment are a first accommodating portion 124 and second contacting portion 122 of a sucking member 120, and a second accommodating portion 144, connecting portion 146, and second stop portion 142 of a head 140. Note that the same reference numerals as used in the first embodiment denote other members adopting the same elements in FIGS. 9A and 9B.

The holding nozzle 400 of this embodiment includes a third extended portion 401 which stands on an end face 123 of a second large-diameter cylindrical portion 120c and extends a second fluid passage 125 in the axial direction, instead of a portion (a circumferential wall 122a) of the second large-diameter cylindrical portion 120c forming the first accommodating portion 124 of the first embodiment. Also, a second contacting portion 402 is formed on an end face of the third extended portion 401, which faces the head 140. Accordingly, the axial-direction length of the third extended portion 401 is made equal to the depth of the depression of the first accommodating portion 124 (the height of the circumferential wall portion 122a) of the first embodiment. A biasing member 150 is arranged on the outer circumferential surface of the third extended portion 401 formed to have an outer diameter almost equal to the inner diameter of the end portion of the biasing member 150. Thus, the sucking member 120 can stably hold the biasing member 150.

Also, the holding nozzle 400 of this embodiment includes a circumferential wall portion 142a' formed to extend toward the sucking member 120 and having a small circumferential-wall height, instead of the circumferential wall portion 142a and second stop portion 142 of the connecting portion 146 forming the second accommodating portion 144 of the first embodiment. In addition, the holding nozzle 400 includes a fourth extended portion 403 standing on an inner end face 143 of the head 140 and extending a connection passage 145 in the axial direction. Furthermore, a second stop portion 404 is formed on an end face of the fourth extended portion 403, which faces the sucking member 120. Accordingly, the axial-direction length of the fourth extended portion 403 is made equal to the depth of the depression of the second accommodating portion 144 (the height of the circumferential wall portion 142a) of the first embodiment. The biasing member 150 is arranged on the outer circumferential surface of the fourth extended portion 403 formed to have an outer diameter almost equal to the inner diameter of the end portion of the biasing member 150. Thus, the head 140 can stably hold the biasing member 150.

The sucking operation of the holding nozzle 400 is the same as that of the holding nozzle 100 according to the first embodiment. As shown in FIG. 9B, in a state in which sucking and holding of the work W are complete, the second contacting portion 402 of the third extended portion 401 contacts with the second stop portion 404 of the fourth extended portion 403, thereby defining the holding position of the sucking member 120.

In this embodiment, the third and fourth extended portions 401 and 403 are connected in the sucking operation, so the second fluid passage 125 and connection passage 145 are rapidly connected. Therefore, the sucking operation can rapidly be performed. In addition, since the third and fourth extended portions 401 and 403 have the function of holding the biasing member 150, the number of parts does not increase. This makes it possible to reduce the weight and rapidly perform the sucking operation.

Fifth Embodiment

FIG. 10 shows the holding nozzle 500 according to the fifth embodiment. FIG. 10 shows a state in which no work W is sucked and no negative pressure is generated in the holding nozzle 500. The difference of this embodiment from the holding nozzle 100 according to the first embodiment is the outer circumferential surface shape of a cylinder 130. Note that the same reference numerals as used in the first embodiment denote other members adopting the same elements in FIG. 10.

The outer circumferential surface of the holding nozzle 500 of this embodiment, which corresponds to a sliding portion 131 of a cylindrical portion 120b and faces a sucking portion 110, is a curved surface 501 which draws a moderate arc in a sectional view. Accordingly, when the measurement unit MU illuminates the holding nozzle 500 from the side of the sucking unit 110 (from the lower side in FIG. 10), the reflection of light projected onto the outer circumferential surface of the curved portion 501 can be diffused. Thus, it is possible to clarify the contour of an image of the work W measured by the measurement unit MU, and reduce measurement errors.

Note that the holding nozzles disclosed as the second to fifth embodiments are applied to the transporting apparatus A explained in the first embodiment. Note also that in these embodiments, one holding unit 10 includes four holding nozzles. However, the number and/or layout of the holding nozzles is not limited to the abovementioned number and/or layout, and is appropriately set. For example, the work W can be held by a smaller number of holding nozzles by laying out three holding nozzles into the shape of a triangle so as to hold three arbitrary portions of the work W. Also, when the size of the work W is at most slightly larger than the contact portion 113, the work W can be held by one holding nozzle. Furthermore, when the work W is long and narrow, two holding nozzles can be laid out so as to hold the two end portions of the work W. It is also possible to switch the sucking members 120 used in the first and second embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2015-45029, filed Mar. 6, 2015, which is hereby incorporated by reference herein in its entirety.

What is claimed is:

1. A holding nozzle for sucking and holding a work by a negative pressure, comprising:
a sucking member including a sucking portion for sucking the work on one side of the sucking member;
a supporting member connected to a negative pressure generating source, including an accommodating portion for accommodating an other side of the sucking member, and configured to support the sucking member so as to be able to move forward and backward; and
a biasing member configured to bias the sucking member in a forward direction of the forward-and-backward movement, the biasing member being a spring member or a resin member,
wherein the supporting member includes, in the accommodating portion, a first stop portion and a second stop portion for respectively defining a forward limit and a backward limit of the forward-and-backward movement of the sucking member,
the sucking member includes, on the other side thereof, a first contacting portion and a second contacting portion for respectively contacting with the first stop portion and the second stop portion,
the supporting member comprises:
a cylinder configured to slidably accommodate the sucking member; and
a head including a connection passage formed on one side of the cylinder and connected to the negative pressure generating source,
a region surrounded by an interior of the cylinder and the head forms the accommodating portion,
the cylinder includes the first stop portion inside thereof, and
the head includes the second stop portion in an inner end portion thereof which is positioned inside the cylinder,
one end portion of the biasing member contacts with an end portion on the other side of the sucking member, and an other end portion of the biasing member contacts with the inner end portion of the head,
the accommodating portion includes a first accommodating portion and a second accommodating portion,
the sucking member forms the first accommodating portion on the other side of the sucking member, the first accommodating portion accommodating one end portion of the biasing member,
the head forming the second accommodating portion which extends from an inner edge portion opposing the end portion on the other side of the sucking member toward the sucking member, and accommodates the other end portion of the biasing member,
the first accommodating portion is formed by a circumferential wall portion extending toward the head, and
the second contacting portion which contacts with the second stop portion is formed by an end portion of the circumferential wall portion on a side of the head, wherein a ratio of a moving stroke of the sucking member to a total length of the biasing member is 1/5 to 1/10, and
the total length of the biasing member is defined in a state that the first contacting portion is contacting with the first stop portion.

2. The nozzle according to claim 1, wherein
the cylinder includes a through hole portion which increases the inner diameter step by step,
the through hole portion has at least a sliding portion slidably contacting with the sucking member and an inner circumferential wall having a diameter larger than that of the sliding portion and
the first stop portion is formed in a step as the connecting portion of the sliding portion and the inner circumferential wall.

3. A holding unit including at least one holding nozzle according to claim 1, comprising:
a nozzle supporting member to which the holding nozzle is attached; and
a nozzle elevating mechanism configured to move the nozzle supporting member upward and downward.

4. The unit according to claim 3, further comprising a plurality of the holding nozzles, and
the nozzle supporting member comprises:
nozzle attaching portions having openings to be respectively attached the holding nozzles thereinto; and
a fluid connecting portion connected to the negative pressure generating source, and including a communication path connected to the nozzle attaching portions.

5. A transporting apparatus including the holding unit according to claim 3, comprising:
a rotating mechanism configured to move the holding unit around a vertical axis parallel to a direction in which the sucking member moves forward and backward;
an elevating mechanism configured to move the holding unit upward and downward; and
a moving mechanism configured to move the holding unit in a horizontal direction perpendicular to the vertical axis.

6. The apparatus according to claim 5, further comprising:
a measurement unit configured to measure a horizontal-direction position of the work held by the holding unit, and a posture of the work in a plane direction parallel to the horizontal direction; and
a driving control unit configured to control driving of the rotating mechanism and the moving mechanism, based on data measured by the measurement unit and position information of a transport destination to which the work is transported.

7. The nozzle according to claim 1, wherein
the head comprises:
a connection passage connected to the negative pressure generating source;
the second accommodating portion configured to accommodate the other end portion of the biasing member; and
a connecting portion connected to a portion on one side of the cylinder, wherein
the cylinder comprises a portion to be connected, and
the portion is connected to the connecting portion.

8. The nozzle according to claim 1, wherein the sucking member includes a fluid passage connecting the accommodating portion and the sucking portion thereinto.

9. The nozzle according to claim 1, wherein a distal end of the sucking portion includes a flat surface for coming in contact with the work.

* * * * *